United States Patent
Indyk et al.

(10) Patent No.: US 10,649,725 B1
(45) Date of Patent: May 12, 2020

(54) INTEGRATING MULTI-CHANNEL INPUTS TO DETERMINE USER PREFERENCES

(71) Applicant: INTUIT INC., Mountain View, CA (US)

(72) Inventors: Benjamin Indyk, San Diego, CA (US); Igor A. Podgorny, Mountain View, CA (US); Raymond Chan, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 310 days.

(21) Appl. No.: 15/336,295

(22) Filed: Oct. 27, 2016

(51) Int. Cl.
   *G06F 3/16* (2006.01)
   *G10L 25/87* (2013.01)
   *G06F 3/0484* (2013.01)
   *G06F 40/274* (2020.01)
   *G10L 15/22* (2006.01)
   *G06F 17/00* (2019.01)

(52) U.S. Cl.
   CPC ............ *G06F 3/167* (2013.01); *G06F 3/0484* (2013.01); *G06F 40/274* (2020.01); *G10L 25/87* (2013.01); *G10L 15/22* (2013.01)

(58) Field of Classification Search
   CPC ..... G10L 15/22; G10L 15/1815; G06F 3/167; G06F 17/279; G06F 17/30713; G06N 99/005
   See application file for complete search history.

(56) References Cited

U.S. PATENT DOCUMENTS

| | | | |
|---|---|---|---|
| 2008/0147404 A1* | 6/2008 | Liu | G10L 15/005 704/256.2 |
| 2013/0159861 A1* | 6/2013 | Rottler | G06F 3/0482 715/727 |
| 2015/0127343 A1* | 5/2015 | Mullor | G10L 17/26 704/244 |
| 2016/0358600 A1* | 12/2016 | Nallasamy | G10L 15/07 |
| 2017/0160813 A1* | 6/2017 | Divakaran | G06F 3/017 |

OTHER PUBLICATIONS

Sakamoto et al., "Voice Augmented Manipulation: Using Paralinguistic Information to Manipulate Mobile Devices" Published Aug. 28, 2013, pp. 69-78 (Year: 2013).*

* cited by examiner

*Primary Examiner* — Quoc A Tran
(74) *Attorney, Agent, or Firm* — Patterson + Sheridan LLP

(57) ABSTRACT

Systems of the present disclosure adjust an interface mode of an application based on paralinguistic features of audio input. The audio input is via a microphone associated with a computing device. A predictive model uses paralinguistic features of the audio input and additional features received from sensors or a user profile to predict an interface mode that a user would currently prefer to use. The interface mode specifies how output is provided and how input is received. The interface mode may also specify which elements of a graphical user interface are displayed, where the elements are placed, and how the elements are sized.

20 Claims, 5 Drawing Sheets

Mobile Device 114

Application 116

I/O Components 118

Microphone 202

Speaker 204

Touch Screen 206

Haptic Actuator 208

Sensors 120

Inertial Measurement Unit (IMU) 210

Global Positioning System (GPS) 212

Battery Gauge 214

Ambient Light Sensor 216

Pedometer 218

Proximity Sensor 220

Barometer 222

FIG. 2

INTEGRATING MULTI-CHANNEL INPUTS TO DETERMINE USER PREFERENCES

BACKGROUND

Field

Embodiments presented herein generally relate to systems for adjusting a user interface. More specifically, the present disclosure provides technology for determining a preferred mode of a user interface based on paralinguistic features of audio input.

Description of the Related Art

Computing devices provide a variety of input/output (I/O) components. For example, users can input data to software applications via a touch screen, a gaming controller, a keyboard, a computer mouse, a microphone, or another input device. Some applications allow users to provide voice input that is processed by voice-recognition software. Applications can also provide output to users via displays, speakers, printers, and other output devices.

Depending on the type of information a user wishes to input, the type of application being used, the type of device being used, and other circumstances, some ways of providing input or receiving output may be more convenient than others. For example, voice input may be convenient on mobile devices. On the other hand, if the user is in an environment where ambient noise could interfere with voice input, it may be more convenient to type on a virtual keyboard displayed on a touch screen. Similarly, it may be convenient for a user driving a motor vehicle to listen to output generated by the application rather than view output on a screen. On the other hand, the user may prefer to see output on a display if the user is in a quiet environment and does not wish for others to overhear. As shown in these examples, different ways of interfacing with an application may be more convenient than others at different times.

For many applications, the way input is received and the way output is provided are fixed in a default interface mode. Some applications provide alternative interface modes that the user can manually configure and activate.

SUMMARY

One embodiment disclosed herein includes a method for adjusting a user interface of an application based on paralinguistic features of user input. The method generally includes receiving audio input from a user interacting with the application; extracting paralinguistic features from the audio input, wherein the paralinguistic features characterize acoustic aspects of the audio input distinct from verbal content; determining, using a predictive model, a mode for presenting the user interface of the application based, at least in part, on the paralinguistic features; and activating the mode of the user interface.

Another embodiment includes non-transitory computer-readable storage medium containing instructions that, when executed by one or more processors, perform an operation for adjusting a user interface of an application based on paralinguistic features of user input. The operation generally includes receiving audio input from a user interacting with the application; extracting paralinguistic features from the audio input, wherein the paralinguistic features characterize acoustic aspects of the audio input distinct from verbal content; determining, using a predictive model, a mode for presenting the user interface of the application based, at least in part, on the paralinguistic features; and activating the mode of the user interface.

Still another embodiment includes a processor and a memory storing one or more applications that, when executed on the processor, performs an operation for adjusting a user interface of an application based on paralinguistic features of user input. The operation generally includes receiving audio input from a user interacting with the application; extracting paralinguistic features from the audio input, wherein the paralinguistic features characterize acoustic aspects of the audio input distinct from verbal content; determining, using a predictive model, a mode for presenting the user interface of the application based, at least in part, on the paralinguistic features; and activating the mode of the user interface.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 2 illustrates a detailed view of a mobile device and I/O components that can be used in techniques of the present disclosure, according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
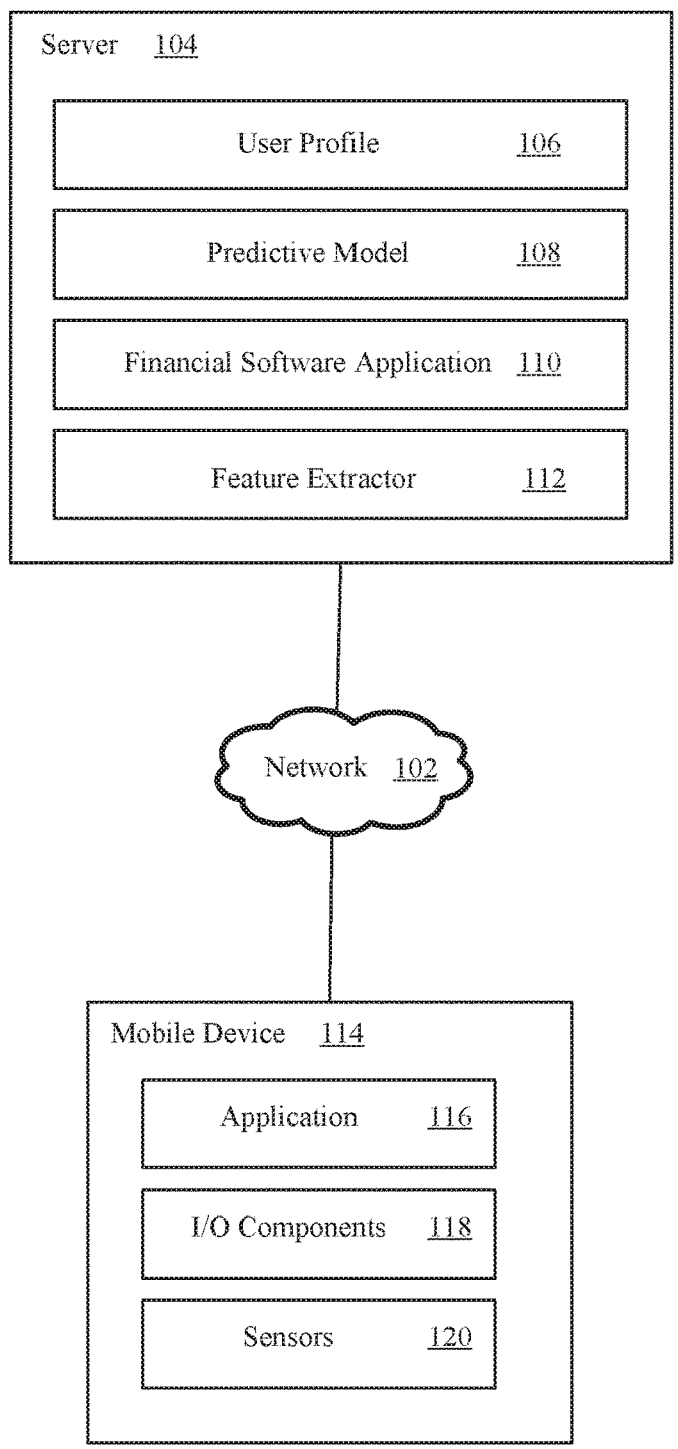
FIG. 1 illustrates a computing environment in which techniques of the present disclosure can operate, according to one embodiment.

Embodiments presented herein provide techniques for adjusting a user interface of an application based on paralinguistic features determined from a user interacting with the application by voice recognition. For example, in one embodiment, a user provides audio input speaking into a microphone. A feature extractor extracts paralinguistic features from the audio input.

Paralinguistic generally means "alongside linguistics" and therefore deals with those phenomena that are mentioned onto or embedded into a verbal message (e.g., acoustics of the verbal message) distinct from the verbal content (i.e., the actual words). For example, low level descriptors may be extracted from frames of the audio stream (e.g., 10-30 ms frames). These acoustic low level descriptors may include intonation (pitch, etc.), intensity (energy, Taeger functions, etc.), linear prediction cepstral coefficients (LPCC), perpetual linear prediction (PLP) parameters, cepstral coefficients (Mel frequency cepstral coefficients (MFCCs), etc.), formants (amplitude, position, width, etc.), spectrum (Mel frequency bands (MFB), NMF-based components, MPEG-7 audio spectrum projection, roll-off, etc.), TF transformation (wavelets, Gabor, etc.), harmonicity (harmonics-to-noise ratio (HNR), noise-to-harmonics ratio (NHR), etc.), and/or perturbation (jitter, shimmer, etc.). Further, the linguistic low level descriptors may include linguistic entities (phoneme sequences, word sequences, etc.), non-linguistic strings (laughter, sighs, etc.), and/or disfluencies (false starts, filled/unfilled pauses, etc.). The paralinguistic information may be extracted utilizing known techniques or software, such as, EmoVoice, OpenEar, Yaafe, Voice Search DB with Accent and Tone, VoiceVault, AT&T APIs, etc.

A predictive model (e.g., a machine-learning model) receives the paralinguistic features as input and determines a preferred mode of a user interface for an application. When determining the preferred mode, the predictive model may use other inputs in addition to the paralinguistic features. For example, the predictive model may receive input from sensors (e.g., an accelerometer or a gyroscope) or use attributes found in a user profile as input.

The application then activates the preferred mode of the user interface. Activating the preferred mode may include, for example, resizing elements of the user interface shown on a display of the computing device, configuring the user interface to provide output via a speaker of the mobile device, or configuring the user interface to receive additional input for the application from the user via the microphone. The preferred mode may also include predictive functionality. The predictive functionality may be triggered when the user provides a partial input, such as a letter, the first few letters of a word, or the first few words of a phrase. The application may predict a complete input (e.g., a complete word or phrase) for the user based on the partial input and provide the complete input to the user for verification.

Note that embodiments of the disclosure are described herein using a financial service as an example of computer software, software interfaces, etc., that may determine a preferred mode of a user interface based on paralinguistic information of the user's voice/speech. One of ordinary skill in the art will recognize that the techniques described herein may be adapted for use by a broad variety of software applications, online or web services, software features, or support services where users can use voice/speech to interact with the software. Additionally, it should be noted that although, in certain examples described herein, the computing device that captures the audio stream and the server are described as performing certain tasks (e.g., extracting paralinguistic information, speech recognition, action selection, etc.), such tasks may be performed by one or more additional computing devices in communication with each other, or vice versa. For example, the audio stream, control signals, and information for display may be communicated between the computing devices, such as described with respect to FIG. 1.

FIG. 1 illustrates a computing environment 100 in which systems of the present disclosure may operate, according to one embodiment. A server 104 and a mobile device 114 are connected to a network 102. Through an application 116 on the mobile device 114, a user interacts with a financial software application 110 executing on the server 104. The financial software application 110 may be software offered as a service and may provide tax preparation, personal financial management, or other types of financial services.

The application 116 serves as a front end for the financial software application 110. The application 116 may be provided through a browser or as another type of application (e.g., an app for mobile devices).

The user communicates with the financial software application 110 through the application 116 via input/output (I/O) components 118. I/O components 118 include a microphone, a speaker, a touch screen, and a haptic actuator (e.g., that can cause the mobile device 114 to vibrate). The microphone of the I/O components 118 can capture audio input for the financial software application 110. For example, an interface mode of the application 116 can allow the user to provide commands or data vocally. The application 116 sends the audio input captured by the microphone to the server 104.

The feature extractor 112 extracts paralinguistic features from the audio input. The predictive model 108 is a machine-learning model that has been trained to infer a preferred interface mode of the application 116 based on the paralinguistic features and (optionally) based on additional features received from sensors 120 or from the user profile 106. For example, the additional features may indicate the current speed, velocity, location, orientation, battery level, or connection quality (e.g., of a cellular or WiFi connection) of the mobile device 114.

The predictive model 108 infers the preferred interface mode based on the paralinguistic features and notifies the application 116. In response, the application 116 switches to the preferred interface mode. The preferred interface mode designates how the application 116 receives input and how the application 116 provides output. For example, in one interface mode, the application 116 may receive input through the microphone 202 and provide output through the speaker 204. In another interface mode, the application 116 may both receive input and provide output through the touch screen 206.

An interface mode can also specify other aspects of how the application 116 interacts with the user. For example, each interface mode that includes a graphical user interface can also specify which visual elements (e.g., buttons, icons, text boxes, sliders) are displayed, how large each element is, where each element is located, which screen-sensitivity setting is used, which screen-brightness setting is used, and which font size and style is used for displayed text. Each interface mode that provides speaker output can specify a volume level, a type of voice used to speak the output (e.g., male or female), and a speaking speed for the voice used to speak the output.

There are many different types of inductive and transductive machine-learning models that can be used for the predictive model 108. Examples of machine-learning models include adsorption models, neural networks, support vector machines, radial basis functions, Bayesian belief networks, association-rule models, decision trees, instance-based models (e.g., k-NN), regression models, Hopfield networks, deep belief networks, and Q-learning models.

Many configurations and parameter combinations may be possible for a given type of machine-learning model. With a neural network, for example, the number of hidden layers, the number of hidden nodes in each layer, and the existence of recurrence relationships between layers can vary. True gradient descent or stochastic gradient descent may be used in the process of tuning weights. The learning rate parameter, which partially determines how much each weight may be adjusted at each step, may be varied. Input features may be normalized. Other parameters that are known in the art, such as momentum, may also be applied to improve neural network performance. In another example, decision trees can be constructed using a variety of approaches. Some non-limiting examples include the iterative dichotomiser 3 (ID3), Classification and Regression Tree (CART), and CHi-squared Automatic Interaction Detection (CHAID) methods. These methods may use one or more different metrics to determine the order in which attribute values are examined in decision trees. Some non-limiting examples of such metrics include information gain and Gini impurity. In addition, pruning methods may be applied to improve decision tree performance. Some non-limiting examples of pruning techniques include reduced error pruning, cost complexity pruning, and alpha-beta pruning.

Furthermore, individual machine learning models can be combined to form an ensemble machine-learning model. An ensemble machine-learning model may be homogenous (i.e., using multiple member models of the same type) or non-homogenous (i.e., using multiple member models of different types). Individual machine-learning models within an ensemble may all be trained using the same training data or may be trained using overlapping or non-overlapping subsets randomly selected from a larger set of training data. At step 310, the application activates the predicted preferred interface mode.

FIG. 2 illustrates a detailed view of the mobile device 114, according to one embodiment. The application 116 can present output to the user via the touch screen 206, the speaker 204, or the haptic actuator 212 (e.g., an eccentric rotating mass (ERM) or a linear resonant actuator (LRA)). The application 116 can also receive user input via the microphone 202 or the touch screen 206.

The sensors 120 can provide data (e.g., sensor readings) that a predictive model can use as additional features (e.g., alongside paralinguistic features) to predict a preferred interface mode of the application 116. For example, the inertial measurement unit (IMU) 210 (e.g., including an accelerometer, a gyroscope, and a magnetometer) can indicate how much the mobile device 114 is accelerating or how the mobile device 114 is oriented. The global positioning system (GPS) can indicate where the mobile device 114 is located and how fast the mobile device 114 is moving. The battery gauge 214 (e.g., Coulomb counter) can indicate a current charge level of a battery coupled to the mobile device 114. The ambient light sensor 216 can indicate ambient light levels for an environment in which the mobile device 114 is located. The pedometer 218 can indicate a rate at which the mobile device 114 is physically oscillating (e.g., due to a user taking steps while holding the device) or a number of steps taken. The proximity sensor 220 can indicate how close the mobile device 114 is to the user's body or a physical object. The barometer 222 can indicate the atmospheric pressure surrounding the mobile device 114.

Paralinguistic features extracted from audio input, additional features received from sensors, and attributes of a user profile provide information for a predictive model (e.g., a machine-learning model). The predictive model is software that takes the features as input and predicts an interface mode that will be convenient for the user.

For example, assume a user carries a mobile device on a morning run. Through a microphone, the user verbally instructs a financial application to report how stocks in an investment portfolio have performed. The financial application receives the user instructions as audio input and uses voice-recognition software to determine what the user is requesting. In addition, a feature extractor extracts paralinguistic features from the audio input. Since the user was running while providing the audio input, the paralinguistic features reflect that the user took frequent breaths and that the user's diaphragm and voice box oscillated slightly with each step. Based on the paralinguistic features, a predictive model that has been trained using other examples predicts an interface mode of the financial application that the user would currently prefer to use. The predictive model may also take additional features into account, such as a feature from a pedometer (e.g., indicating that the user is taking steps), and a feature from a GPS (e.g., indicating that the user is moving).

The interface mode may provide output in response to the user's instructions through a speaker associated with the mobile device (e.g., an internal speaker or earbuds). This is convenient for the user because it may be difficult to read text output on a display of the mobile device (e.g., due the jarring motion and arm swinging involved in running). In addition, the interface mode may also provide a pause button and a repeat button on a touch screen of the mobile device. Each button may be large relative to the size of the touch screen (e.g., having a width that is a third or more of the width of the touch screen) so that the user can easily tap the button despite movement from running. The interface mode may also have a low screen-sensitivity level to prevent random contact (e.g., due to motion from running) from being interpreted as user input.

In another example, the user carries the mobile device while walking through a dimly lit area where other people are sleeping. The user whispers a question into the microphone asking about the status of a recently-filed tax return. The financial application receives this audio input and uses voice-recognition software to determine what the user is requesting. In addition, the feature extractor extracts paralinguistic features from the audio input. The paralinguistic features reflect that the user whispered. Based on the paralinguistic features, the predictive model infers an interface mode of the financial application that the user would currently prefer to use. The predictive model may also take additional features into account, such as a feature from an ambient light sensor that indicates the user is in a dark environment.

The interface mode may provide a text response to the user's question via the touch screen. The interface mode may also apply a reduced brightness setting for the touch screen. This may be convenient for the user because speaker output or a high brightness setting would disturb the people who are sleeping in the dimly lit area surrounding the user. The interface mode may also display the text response in a 12-point serif font so that the user can read the text response more easily in the dark.

In another example, the user carries the mobile device while attending a noisy party. The user verbally asks for the financial application to report whether a recent payment has posted to a checking account. The financial application receives this audio input and uses voice-recognition software to determine what the user is requesting. In addition, the feature extractor extracts paralinguistic features from the audio input. The paralinguistic features reflect that the user is in a noisy environment.

Based on the paralinguistic features, the predictive model infers an interface mode of the financial application that the user would currently prefer to use. The interface mode may provide a text response to the user's question via the touch screen. This may be convenient for the user because speaker output might be difficult for the user to hear in the noisy environment. In addition, the interface mode may obscure or hide on-screen elements that may contain sensitive information (e.g., the number of the checking account) so that other people at the party will not be able to see the sensitive information by looking over the user's shoulder.

In another example, the user tries unsuccessfully to get the application to perform a desired operation. The user becomes frustrated. When the user gives voice commands to the application, paralinguistic features of the user's voice reflect the user's frustration. Based on the paralinguistic features, the predictive model selects an interface mode that prominently displays a button for requesting assistance.

Figure 3:
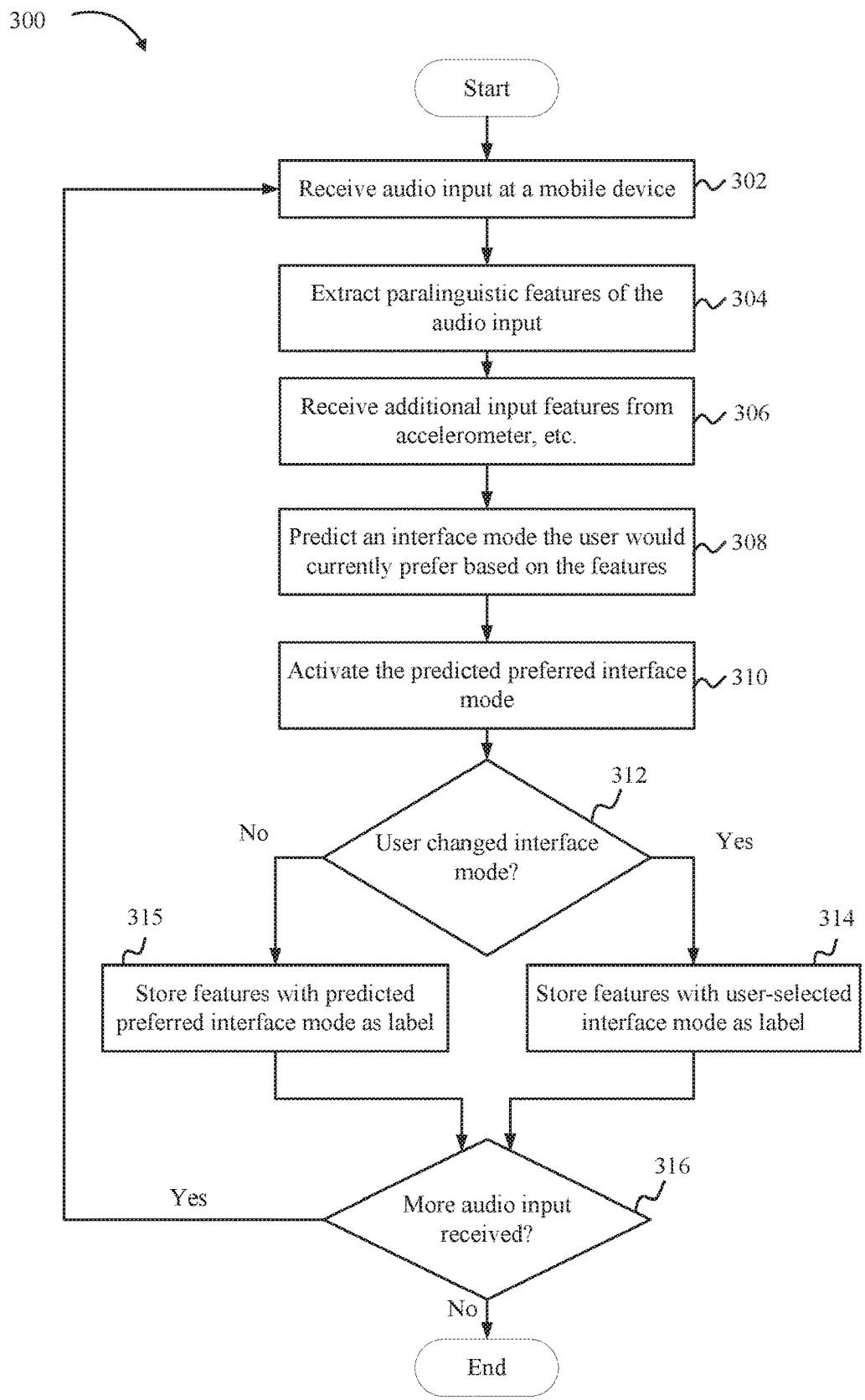
FIG. 3 a method for adjusting a user interface of an application, according to one embodiment.

FIG. 3 illustrates a method 300 for adjusting a user interface of an application, according to one embodiment. At step 302, an application receives audio input via a microphone at a mobile device. The audio input may include sounds made by a user, such as words, sighs, laughter, grunts, or breaths. The audio input may also include background noise.

At step 304, a feature extractor identifies paralinguistic features of the audio input. For example, some of the paralinguistic features may be low level descriptors that are extracted from frames of the audio stream (e.g., 10-30 millisecond frames). These acoustic low level descriptors may include intonation (pitch, etc.), intensity (energy, Taeger functions, etc.), linear prediction cepstral coefficients (LPCC), perpetual linear prediction (PLP) parameters, cepstral coefficients (Mel frequency cepstral coefficients (MFCCs), etc.), formants (amplitude, position, width, dispersion, etc.), spectrum (Mel frequency bands (MFB), NMF-based components, MPEG-7 audio spectrum projection, roll-off, etc.), TF transformation (wavelets, Gabor, etc.), harmonicity (harmonics-to-noise ratio (HNR), noise-to-harmonics ratio (NHR), etc.), and/or perturbation (jitter, shimmer, etc.). Further, the paralinguistic features may include low level descriptors such as phoneme sequences, non-linguistic strings (laughter, sighs, etc.), and/or disfluencies (false starts, filled/unfilled pauses, etc.). The paralinguistic features may also include fundamental frequency, volume, and other measurable characteristics of the audio input. The paralinguistic information may be extracted utilizing software such as EmoVoice, OpenEar, Yaafe, Voice Search DB with Accent and Tone, VoiceVault, AT&T APis, etc.

At step 306, the application receives additional input features (e.g., sensor data) from sensors, such as an accelerometer and a GPS. In one example, the additional input features may describe the current orientation, speed, and location of the mobile device.

At step 308, a predictive model selects an interface mode of the application based on the paralinguistic features and based on any additional input features received from sensors. For example, a machine-learning model may be trained to predict a preferred interface mode based on paralinguistic features. In one embodiment, predicting a preferred interface mode comprises predicting a degree of customer satisfaction for each of a set of available interface modes and selecting the interface mode with the highest predicted degree of customer satisfaction to be the preferred mode.

At step 312, the application detects whether the user changed the interface mode of the application (e.g., by activating an alternative interface mode) within a predefined amount of time after the application activated the predicted preferred interface mode. If so, it is likely that the user currently prefers to use the user-selected interface mode rather than the predicted preferred interface mode. The application stores the features as a training instance for the predictive model that has the user-selected interface mode as a label in step 314. Otherwise, the application stores the features as a training instance for the predictive model that has the predicted preferred interface mode as a label in step 315. In this manner, steps 314 and 315 provide training data for the predictive model as part of a feedback loop.

At step 316, the application determines whether more audio input has been received. If so, steps 302-315 are repeated. Otherwise, the method 300 terminates.

Figure 4:
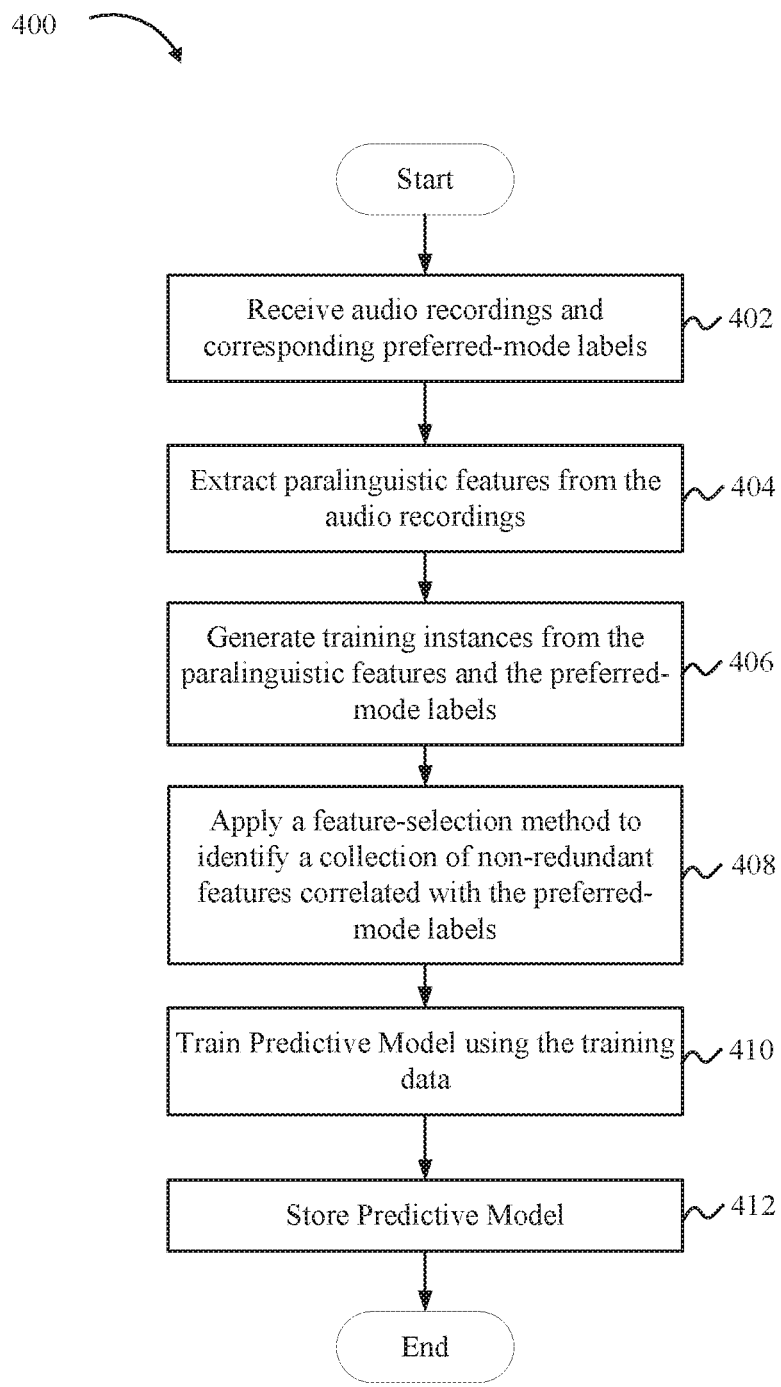
FIG. 4 illustrates a method for training a predictive model to predict a preferred interface mode based on paralinguistic features, according to one embodiment.

FIG. 4 illustrates a method for training a predictive model to predict a preferred interface mode based on paralinguistic features, according to one embodiment. At step 402, a model creator receives audio recordings and corresponding preferred-mode labels. Each audio recording represents audio input received from a user (including background noise) during a time when a specific interface mode is preferred. In one embodiment, the term "preferred interface mode" refers to the interface mode with a highest degree of customer satisfaction compared to other modes in a set of available interface modes. The preferred interface mode (or its associated degree of customer satisfaction) may have been specified explicitly through user feedback in response to a survey. The preferred interface mode (or its associated degree of customer satisfaction) may also have been determined implicitly (e.g., if paralinguistic features of voice input indicate the user felt a positive emotion when the preferred interface was used) or based on user conduct (e.g., if the user manually switched to the preferred interface mode). The corresponding preferred-mode label indicates the preferred interface mode for a given audio recording.

At step 404, the model creator extracts a set of paralinguistic features from each audio recording. At step 406, the model creator generates training instances from the features and the preferred-mode labels. Each training instance includes the paralinguistic features extracted from an audio recording and the interface mode (the label) corresponding to that audio recording. The interface mode is the value (e.g., of the target variable) that the predictive model is trained to predict for that audio recording.

At step 408, the model creator applies a feature-selection method to identify a collection of non-redundant paralinguistic features that are correlated with the preferred-mode labels. Some feature-selection techniques that the model may apply include the Las Vegas Filter (LVF), Las Vegas Incremental (LVI), Relief, Sequential Forward Generation (SFG), Sequential Backward Generation (SBG), Sequential Floating Forward Search (SFFS), Focus, Branch and Bound (B & B), and Quick Branch and Bound (QB&B) techniques.

There are several reasons why it is useful to identify the collection of non-redundant paralinguistic features that are correlated with the preferred-mode labels before training the predictive model. For example, some of the features extracted at step 404 may not be appreciably correlated to the preferred-mode labels that the predictive model is designed to predict. Irrelevant features can cause overfitting some predictive models. In addition, one feature may be so closely correlated with another feature that it would be redundant to use both for training. Furthermore, redundant features can blunt the accuracy of some distance metrics used in instance-based (nearest neighbor) models. Also, when irrelevant or redundant features are present in training data, most predictive models take longer to train.

In general, the number of features included in the collection should be small relative to the total number of training instances in the training data. In some embodiments, the number of features selected for the collection can be at least two orders of magnitude smaller than the number of training instances in the training data.

At step 410, the model creator trains the predictive model to predict the target variable (i.e., the preferred-mode label)

based on the collection of non-redundant paralinguistic features. The way the training is accomplished depends on which type of machine-learning model used as the predictive model. A neural network, for example, iteratively adjusts weights within layers of network nodes based on an error terms defined by the backpropagation technique. Depending on the learning rate and the number of layers, the neural network may be trained for several hundred epochs (i.e., iterations through the entire set of training data). At step 412, the model creator stores the predictive model for future use. The predictive model is stored in a format that is accessible to a financial software application.

Figure 5:
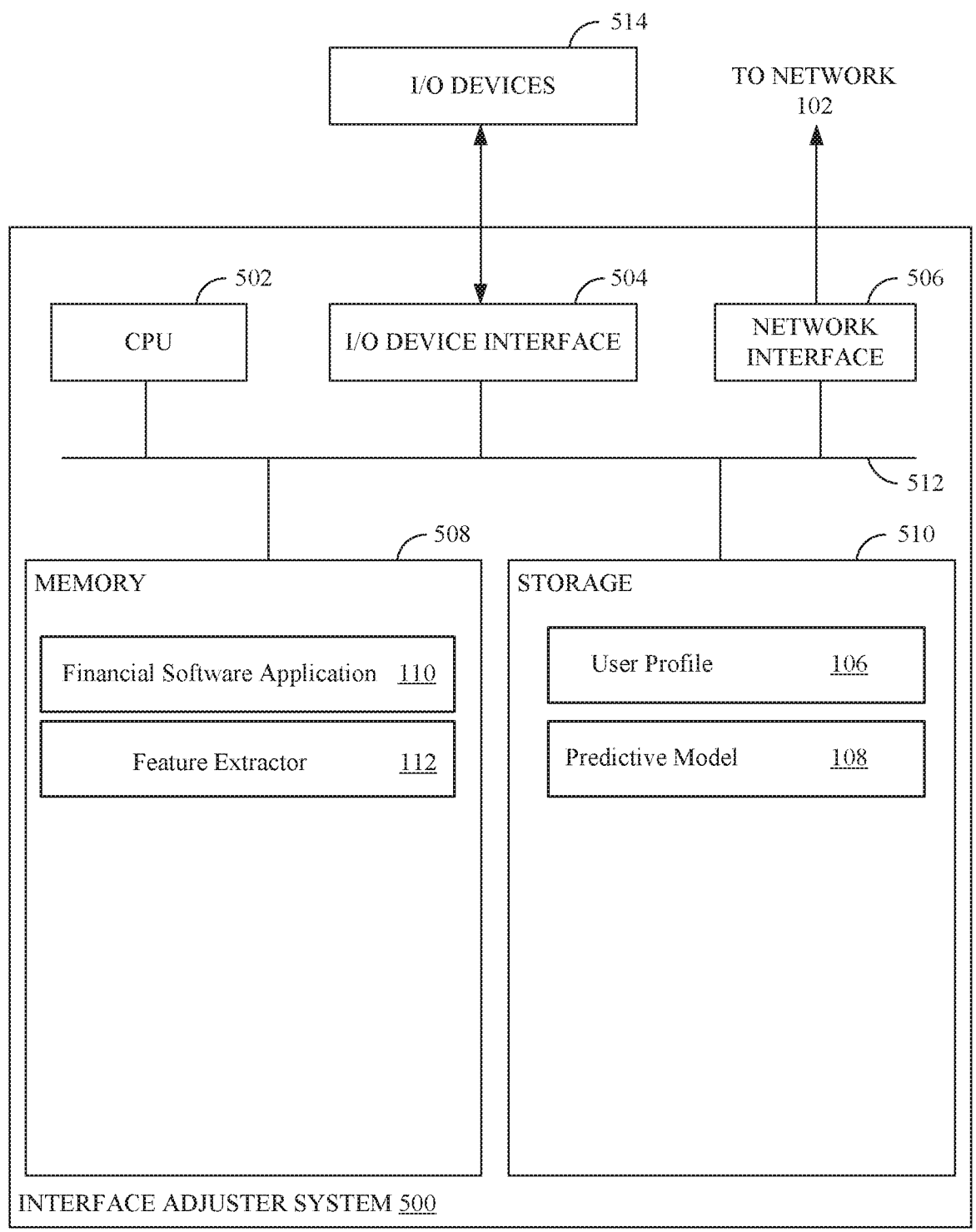
FIG. 5 illustrates an interface adjuster system that adjusts a user interface based on paralinguistic features of audio input, according to one embodiment.

FIG. 5 illustrates an interface adjuster system 500 that selects an interface mode based on paralinguistic features, according to an embodiment. As shown, the interface adjuster system 500 includes, without limitation, a central processing unit (CPU) 502, one or more I/O device interfaces 504 which may allow for the connection of various I/O devices 514 (e.g., keyboards, displays, mouse devices, pen input, etc.) to the interface adjuster system 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data among the CPU 502, I/O device interfaces 504, network interface 506, memory 508, and storage 510. CPU 502 can represent a single CPU, multiple CPUs, a single CPU having multiple processing cores, and the like. Additionally, the memory 508 represents random access memory. Furthermore, the storage 510 may be a disk drive. Although shown as a single unit, the storage 510 may be a combination of fixed or removable storage devices, such as fixed disc drives, removable memory cards or optical storage, network attached storage (NAS), or a storage area-network (SAN).

As shown, memory 508 includes a financial software application 110 and a feature extractor 112. As shown, storage 510 includes a user profile 106 and a predictive model 108. The financial software application 110 receives audio input captured by a microphone at a mobile device via the network interface 506. The feature extractor 112 extracts paralinguistic features from the audio input. The predictive model 108 predicts a preferred interface mode for the mobile device based on the paralinguistic features and, optionally, based on the user profile and additional features (e.g., received from sensors at the mobile device). The financial software application 110 sends an indication of the predicted preferred interface mode to the mobile device via the network interface 506.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for adjusting a user interface of an application, the method comprising:
receiving audio input from a user interacting with an application on a mobile device;
extracting application instructions from the audio input based on verbal content of the audio input;
extracting paralinguistic features from the audio input, based on non-verbal content of the audio input;
providing the paralinguistic features as inputs to a predictive model configured to predict a preferred user interface mode for the application;
receiving, from the predictive model, a predicted preferred user interface mode for the application;
activating the predicted preferred user interface mode of the application;
activating a predictive input mode associated with the predicted preferred user interface mode;
receiving a partial application input from the user while in the predicted preferred user interface mode;
providing a predicted complete application input to the user; and
providing application output based on the predicted complete application input via the predicted preferred user interface mode.

2. The method of claim 1, further comprising:
prompting the user for verification of the predicted application complete input; and
receiving a verification of the predicted complete application input from the user.

3. The method of claim 1, wherein:
the partial application input comprises a partial text input, and
the predicted complete application input comprises a complete text input.

4. The method of claim 1, further comprising:
providing one or more user attributes from a user profile to the predictive model,
wherein the predicted preferred user interface mode is further based on the one or more user attributes.

5. The method of claim 1, wherein the predictive model is a neural network model.

6. The method of claim 1, further comprising:
determining that the user has not changed the predicted preferred user interface mode to an alternate user interface mode for a predefined amount of time; and
creating a training instance for the predictive model associating the paralinguistic features with the predicted preferred user interface mode.

7. The method of claim 1, further comprising:
receiving a command from the user to change from the predicted preferred user interface mode to an alternate user interface mode; and
creating a training instance for the predictive model associating the paralinguistic features with the alternate user interface mode.

8. A method for adjusting a user interface of an application, the method comprising:
receiving audio input from a user interacting with an application on a mobile device;
extracting application instructions from the audio input based on verbal content of the audio input;
extracting paralinguistic features from the audio input based on non-verbal content of the audio input, wherein the paralinguistic features indicate that the user is moving;
receiving sensor data from a sensor of the mobile device;
providing the paralinguistic features and the sensor data as inputs to a predictive model configured to predict a preferred user interface mode for the application;
receiving, from the predictive model, a predicted preferred user interface mode for the application;
activating the predicted preferred user interface mode of the application by:
changing a mode of providing application output; and
changing a screen sensitivity of a touch-screen display of the mobile device; and
providing application output via the predicted preferred user interface mode based on the application instructions.

9. The method of claim 8, wherein activating the predicted preferred user interface mode further comprises: adding one or more user interface elements to the user interface.

10. The method of claim 8, wherein activating the predicted preferred user interface mode further comprises: increasing a size of one or more user interface elements to the user interface.

11. The method of claim 8, wherein the sensor of the mobile device is a pedometer.

12. The method of claim 8, wherein the sensor of the mobile device is a GPS sensor.

13. The method of claim 8, wherein changing the screen sensitivity of the touch-screen display of the mobile device comprises lowering the screen sensitivity of the touch-screen display.

14. The method of claim 8, further comprising:
determining that the user has not changed the predicted preferred user interface mode to an alternate user interface mode for a predefined amount of time; and
creating a training instance for the predictive model associating the paralinguistic features with the predicted preferred user interface mode.

15. The method of claim 8, further comprising:
receiving a command from the user to change from the predicted preferred user interface mode to an alternate user interface mode; and
creating a training instance for the predictive model associating the paralinguistic features with the alternate user interface mode.

16. A method for adjusting a user interface of an application, the method comprising:
receiving audio input from a user interacting with an application on a mobile device;
extracting application instructions from the audio input based on verbal content of the audio input;
extracting paralinguistic features from the audio input, based on non-verbal content of the audio input, wherein the paralinguistic features indicate the user is in a noisy environment;
providing the paralinguistic features as inputs to a predictive model configured to predict a preferred user interface mode for the application;
receiving, from the predictive model, a predicted preferred user interface mode of the application;
activating the predicted preferred user interface mode of the application by:
changing a mode of providing application output; and
hiding one or more user interface elements of the application; and
providing application output via the predicted preferred user interface mode based on the application instructions.

17. The method of claim 16, wherein changing the mode of providing application output comprises changing the mode from audio output to textual output.

18. The method of claim 16, wherein providing application output via the predicted preferred user interface mode comprises outputting a text response to the audio input from the user.

19. The method of claim 16, further comprising:
determining that the user has not changed the predicted preferred user interface mode to an alternate user interface mode for a predefined amount of time; and
creating a training instance for the predictive model associating the paralinguistic features with the predicted preferred user interface mode.

20. The method of claim 16, further comprising:
receiving a command from the user to change from the predicted preferred user interface mode to an alternate user interface mode; and
creating a training instance for the predictive model associating the paralinguistic features with the alternate user interface mode.

* * * * *